Figure 1:
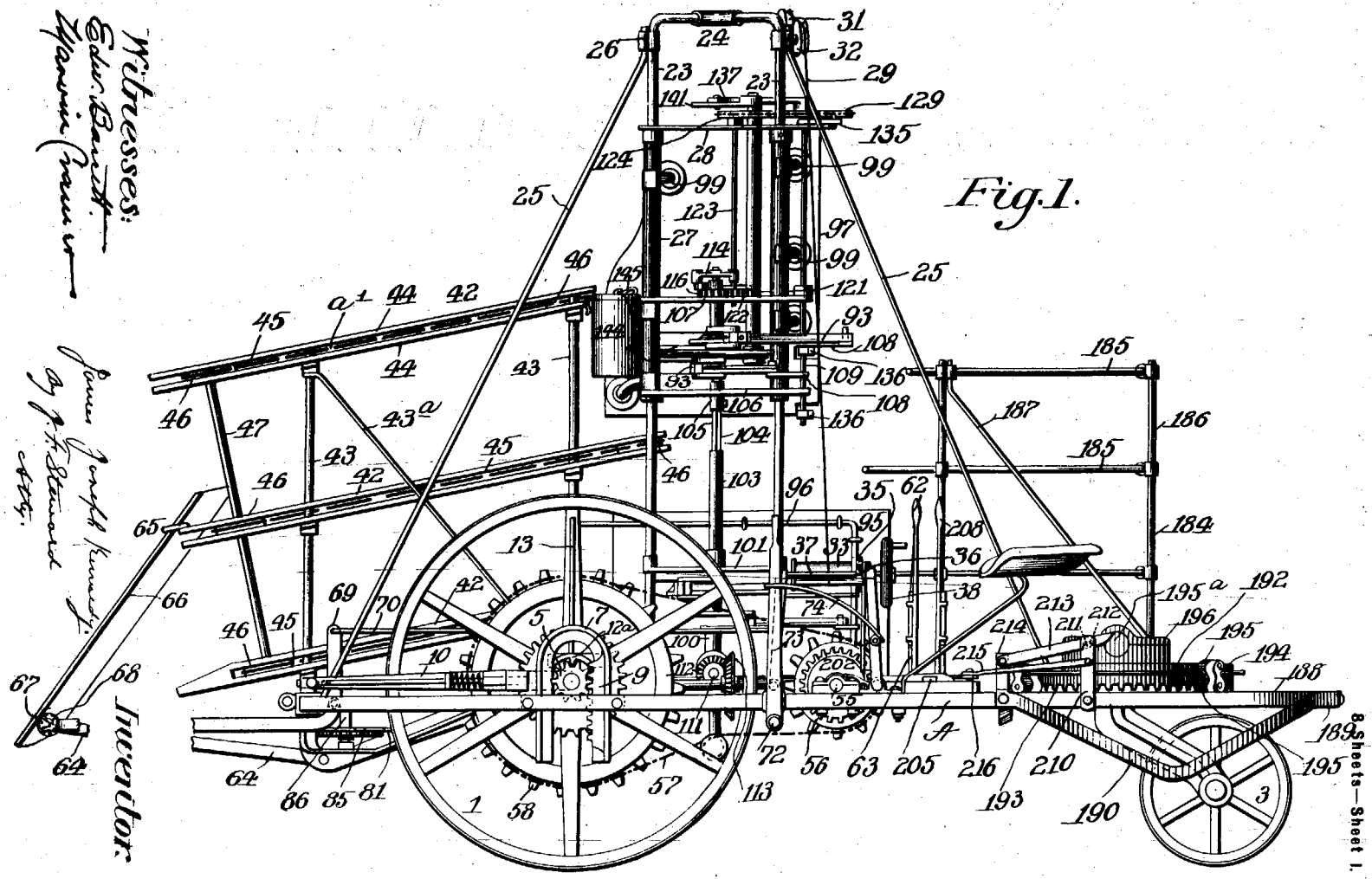

No. 12,050. Reissued Oct. 28, 1902.

J. J. KENNEDY.

HARVESTER.

(Application filed Nov. 29, 1901.)

8 Sheets—Sheet 1.

Witnesses:
Edw. Barrett.
Marvin Cramer

Inventor:
James Joseph Kennedy.
By J. F. Steward
Atty.

No. 12,050. Reissued Oct. 28, 1902.

J. J. KENNEDY.

HARVESTER.

(Application filed Nov. 29, 1901.)

8 Sheets—Sheet 2.

Witnesses:
Edw. Bennett
Marvin Crane

Inventor.
James Joseph Kennedy.
By F. F. Steward Atty.

No. 12,050. Reissued Oct. 28, 1902.
J. J. KENNEDY.
HARVESTER.
(Application filed Nov. 29, 1901.)
8 Sheets—Sheet 3.
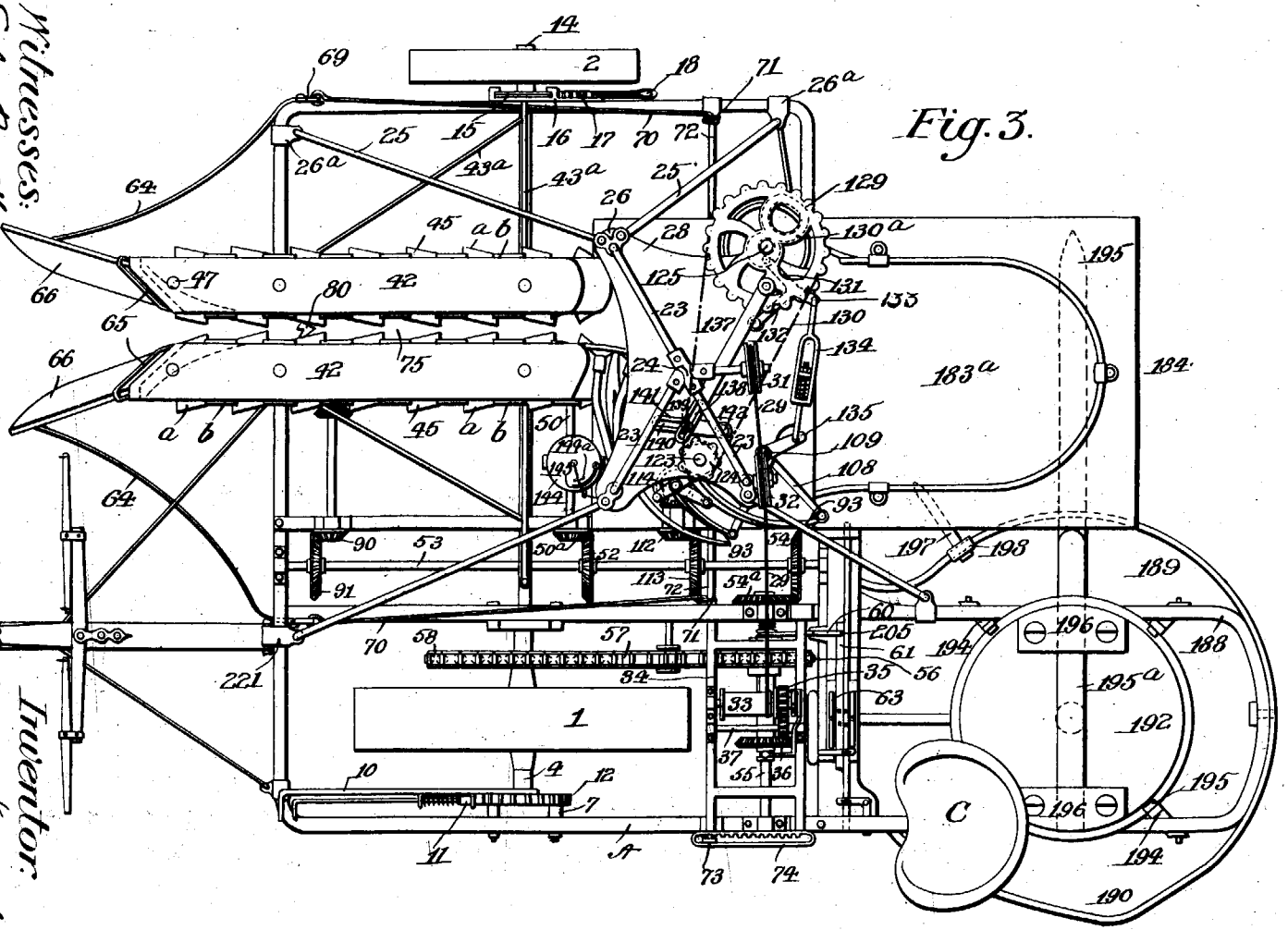
Witnesses:
Edw. Barrett.
Marvin Cramer
Inventor:
James Joseph Kennedy.
By J. F. Steward
Atty.

No. 12,050. Reissued Oct. 28, 1902.
J. J. KENNEDY.
HARVESTER.
(Application filed Nov. 29, 1901.)
8 Sheets—Sheet 4.
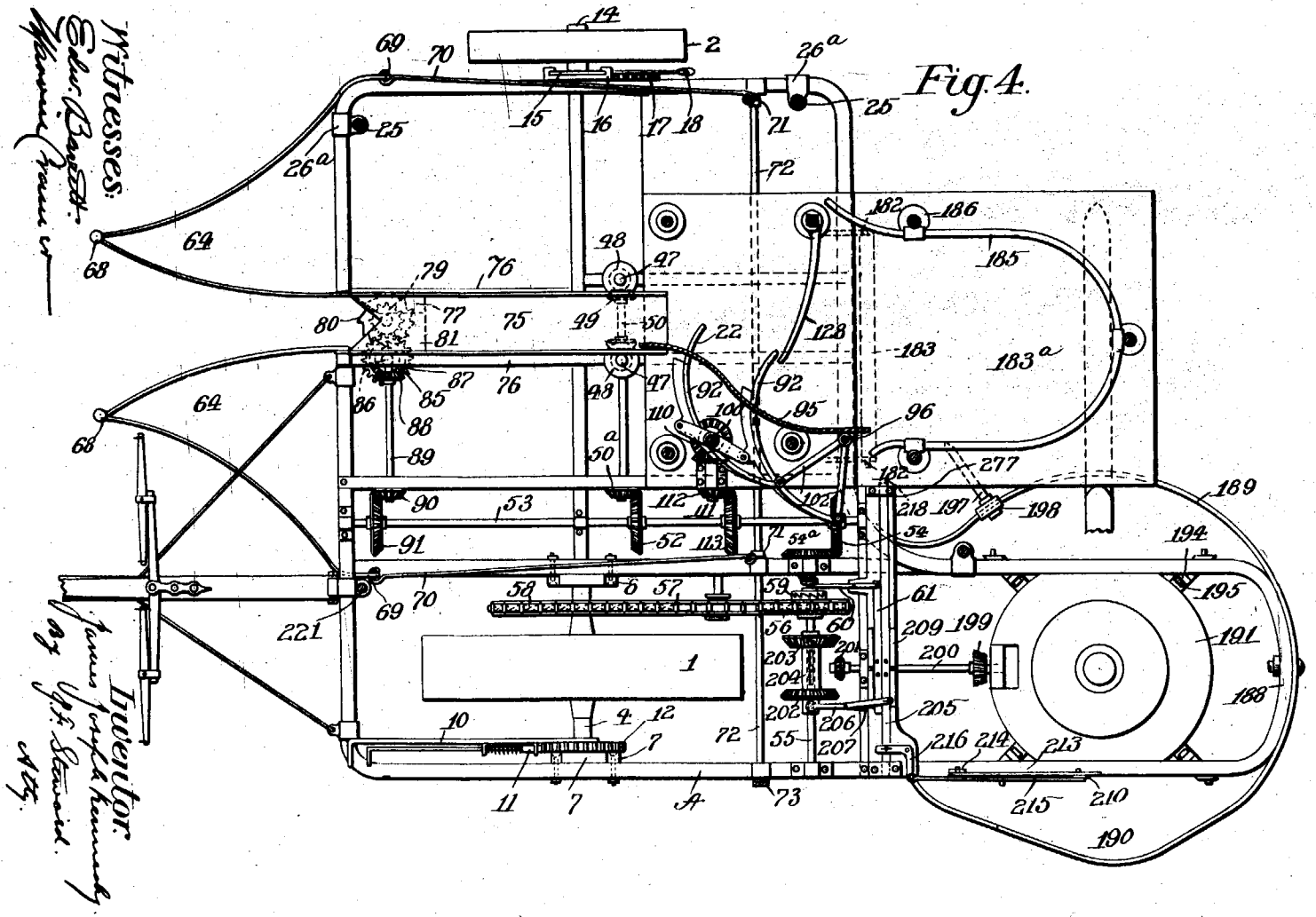
Witnesses:
Edw. Barrett.
Wm. Franciscus
Inventor:
James Joseph Kennedy
by J. F. Steward.
Atty.

No. 12,050.

Reissued Oct. 28, 1902.

J. J. KENNEDY.

HARVESTER.

(Application filed Nov. 29, 1901.)

8 Sheets—Sheet 5.

Witnesses;
Edw. Barrett
Marvin Clancy

Inventor
James Joseph Kennedy
By J. F. Steward.
Atty.

No. 12,050.

J. J. KENNEDY.

HARVESTER.

(Application filed Nov. 29, 1901.)

Reissued Oct. 28, 1902.

8 Sheets—Sheet 6.

Witnesses;
Edw. Barrett
Wm. Ramsey

Inventor
James Joseph Kennedy
By G. F. Steward
Atty.

No. 12,050. Reissued Oct. 28, 1902.

J. J. KENNEDY.

HARVESTER.

(Application filed Nov. 29, 1901.)

8 Sheets—Sheet 7.

Witnesses;
Edw. Barrett
Marvin Cramer

Inventor
James Joseph Kennedy
By J. F. Steward,
Atty.

No. 12,050. Reissued Oct. 28, 1902.

J. J. KENNEDY.

HARVESTER.

(Application filed Nov. 29, 1901.)

8 Sheets—Sheet 8.

Witnesses;
Edw. Barrett
Warren Franco

Inventor
James Joseph Kennedy
By
J. F. Steward.
Atty.

BEST AVAILABLE COPY

UNITED STATES PATENT OFFICE.

JAMES JOSEPH KENNEDY, OF HANOVER, ILLINOIS, ASSIGNOR TO DEERING HARVESTER COMPANY, OF CHICAGO, ILLINOIS.

HARVESTER.

SPECIFICATION forming part of Reissued Letters Patent No. 12,050, dated October 28, 1902.

Original No. 643,227, dated February 13, 1900. Application for reissue filed November 29, 1901. Serial No. 84,131.

*To all whom it may concern:*

Be it known that I, JAMES JOSEPH KENNEDY, a resident of Hanover, in the county of Jo Daviess and State of Illinois, have invented certain new and useful Improvements in Harvesters; and I do hereby declare the following to be a full, clear, and exact description of the invention, such as will enable others skilled in the art to which it appertains to make and use the same.

My invention relates to an improvement in harvesters, and more particularly to corn-harvesters, one object of the invention being to provide apparatus by means of which corn can be cut, tied up in bundles, and deposited upon the ground in the form of shocks automatically, quickly, and accurately. I accomplish the first one of the most essential results sought by the combination of the following three instrumentalities, namely: the means for gathering and cutting the stalks of corn, means for binding them into bundles, and the table upon which a shock of bundles is formed and from it deposited, preferably automatically.

A further object is to produce an apparatus for the purpose stated which in view of the various operations upon the corn which it is adapted to perform shall be comparatively simple in construction and which shall be effectual in all respects in the performance of its functions.

With these objects in view the invention consists in certain novel features of construction and combinations and arrangements of parts, as hereinafter set forth, and pointed out in the claims.

Figures 2, 15:
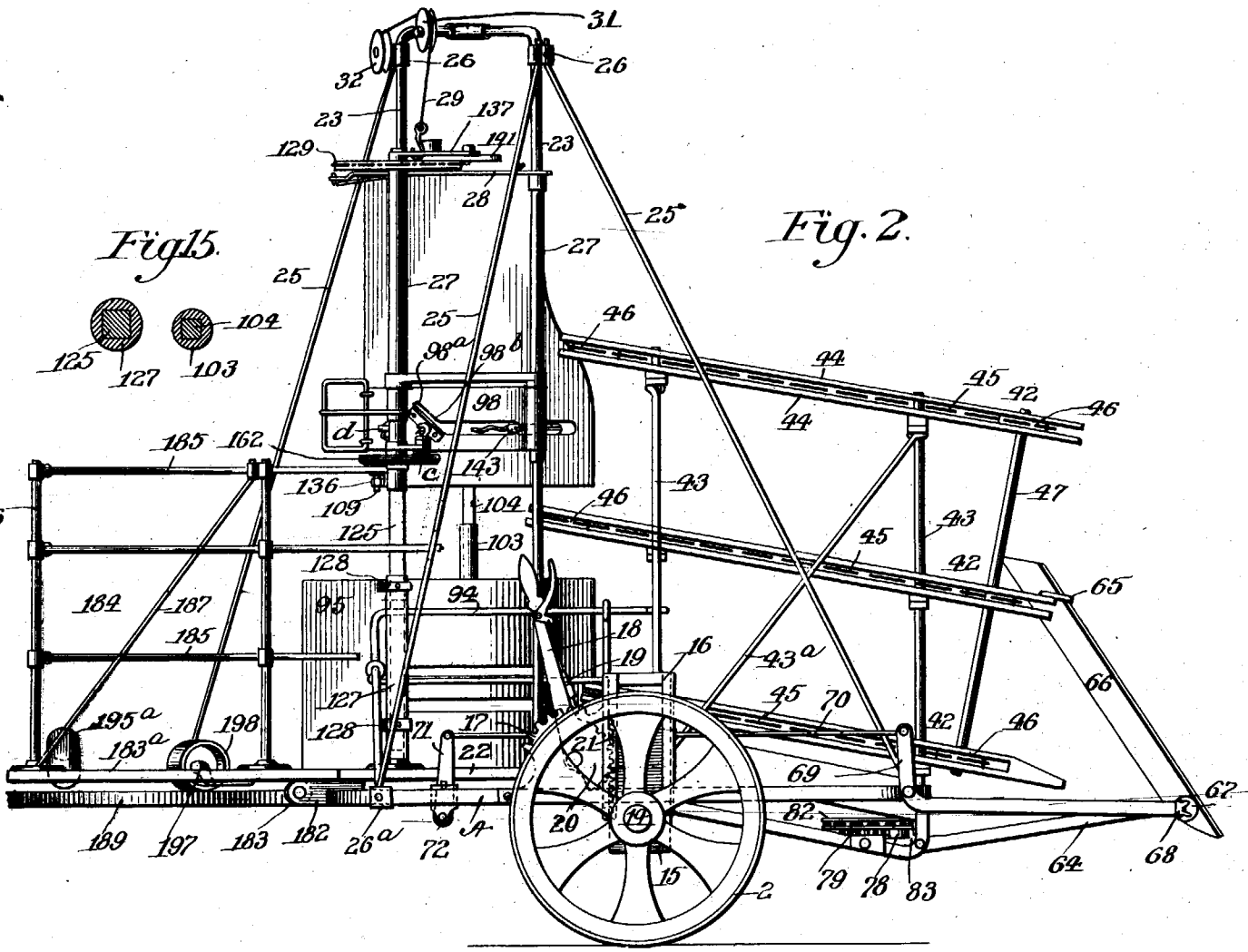
Figure 6:
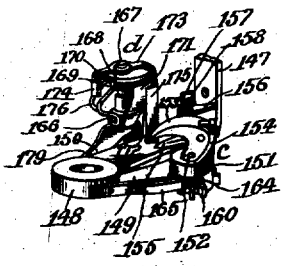
Figure 5:
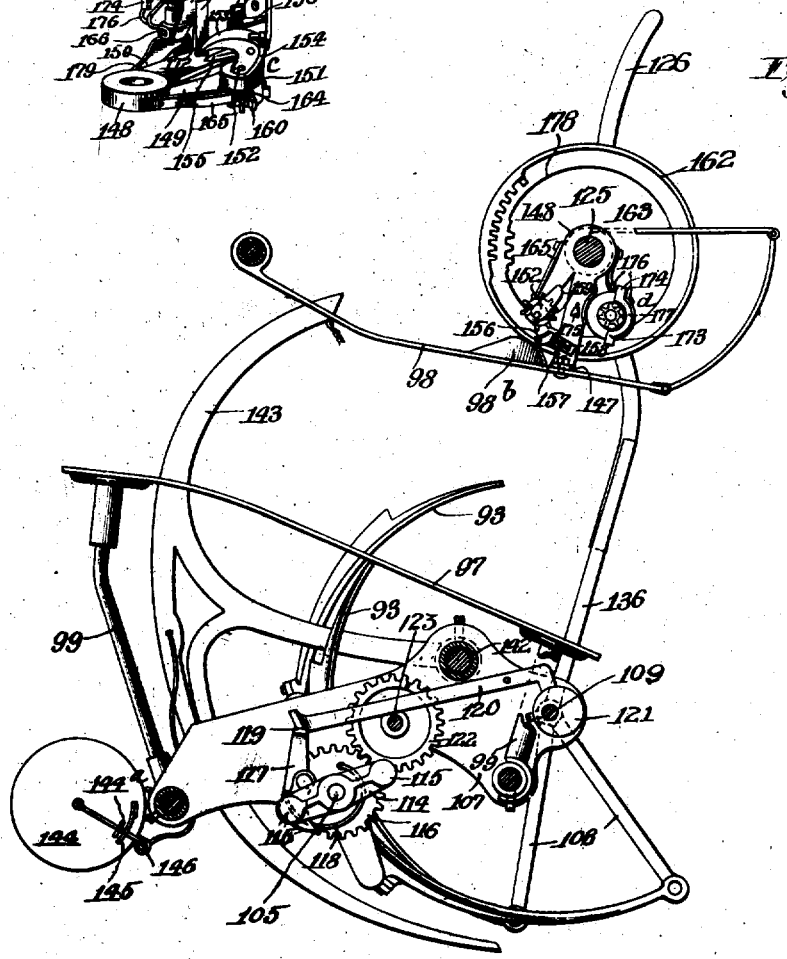
Figure 14:
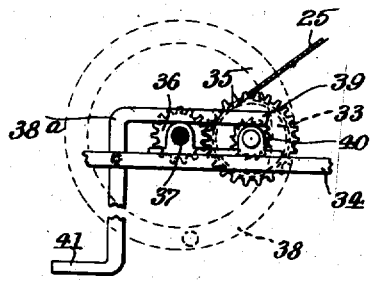
Figure 12A:
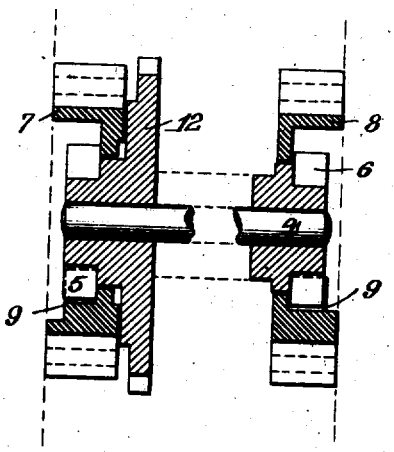
Figure 10:
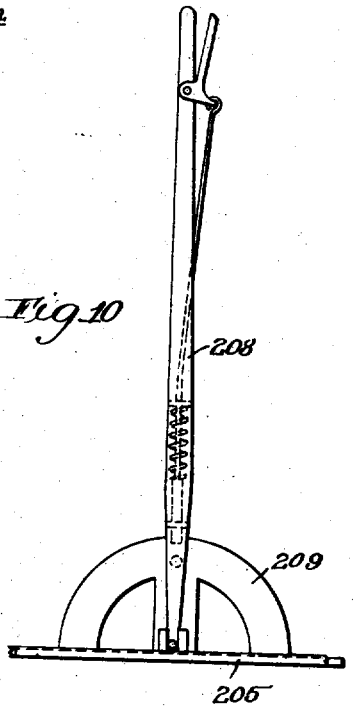
Figure 7:
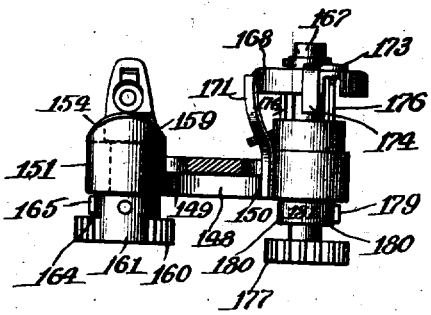
Figure 8:
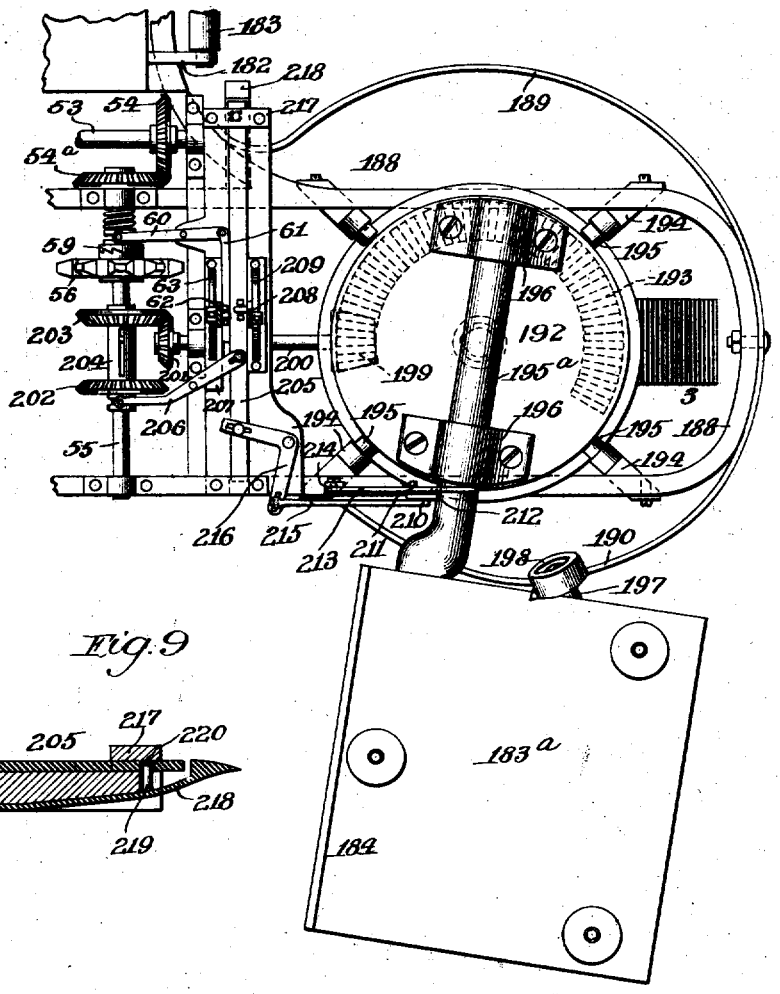
Figure 9:
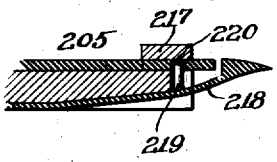
Figure 12:
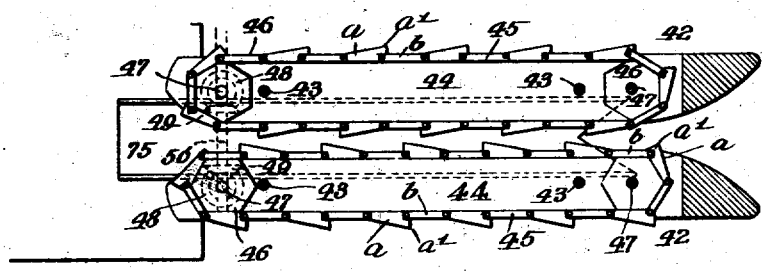
Figure 16:
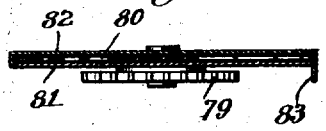
Figure 13:
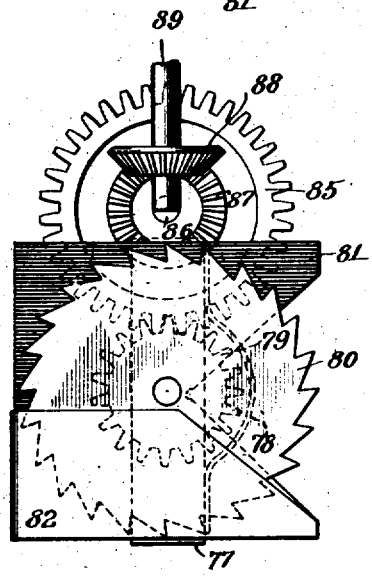
Figure 11:
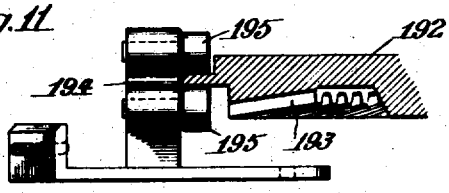

In the accompanying drawings, Figure 1 is a side elevation of my improved harvester. Fig. 2 is a similar view taken from the opposite side of the machine. Fig. 3 is a plan view. Fig. 4 is a horizontal sectional view. Fig. 5 illustrates details of the binder and knotter appliances. Fig. 6 is a perspective view showing the knotter. Fig. 7 is a perspective view showing the knotter. Figs. 8, 9, 10, and 11 show details of the shock-discharging devices. Fig. 12 is a detail view illustrating the levers. Fig. 13 is a detail view of devices for raising and lowering the sleigh. Fig. 14 is a detail view of cutter. Fig. 15 is a detail view of raising devices for binder-frame. Fig. 15 is a detail view showing cross-sections of the telescoping shafts 103 104 and 125 127. Fig. 16 is a sectional view through the cutting mechanism.

A represents the bottom horizontal frame of the apparatus, in one side of which the traction-wheel 1 is mounted and at the other side of which the grain-wheel 2 is located, the apparatus being normally maintained in a horizontal or approximately horizontal position by means of a caster-wheel 3, disposed at the rear part of the machine, in a manner hereinafter explained. The hub of the traction-wheel is mounted to revolve on a shaft 4, provided at its respective ends with pinions 5 6, adapted to move within yokes 7 8, secured to the frame A, and mesh with rack-teeth 9 on one vertical member of each yoke. An operating-lever 10 is mounted loosely at its lower end on the shaft 4 and provided with a locking-bar 11 to engage a toothed wheel 12, secured to the shaft 4. From this construction it will be seen that by operating the lever 10 the shaft 4 will be turned and motion transmitted through the pinions 5 6 to the yokes 7 8 to adjust one side of the apparatus vertically and retained at any desired adjustment by means of a dog $12^a$ to engage the pinion 5, said dog having a rod 13, passing through the yoke 7, by means of which to manipulate said dog.

The grain-wheel 2 is mounted loosely on a stud 14, projecting from a plate 15, the latter being adapted to slide in guides 16, secured to the base-frame A. A toothed segment 17 is secured to the base-frame, and to said segment an operating-lever 18 is pivotally attached and provided with a locking-bar 19 to engage said toothed segment. The lever 18 is provided with a toothed segment 20, adapted to mesh with rack-teeth 21 on one vertical edge of the plate or slide 15, so that when the lever 18 is operated the bearing of the grain-wheel 2 will be raised or lowered and the side of the apparatus to which said wheel is attached adjusted vertically. Thus it will be seen that by operating the levers 10 and 18 the machine can be readily adjusted for the level and condition of the ground over which it is operated.

The base-frame A is provided with a platform or table 22, over which the binding mechanism is disposed, for which purpose a series of standards 23 is mounted on said platform, the upper ends of said standards being bent inwardly and connected together by means of a coupling 24. The vertical frame thus formed is braced by means of a series of truss-rods 25, secured to the upper end thereof by means of couplings 26 and secured at their lower ends to the horizontal base-frame by means of clamps 26ª. The frame of the binder consists of a series of tubular rods 27, adapted to slide vertically on the standards 23, and thus permit the binder to be adjusted vertically according to the height of the corn being harvested. The tubular rods 27 of the binder-frame are connected together by means of suitable cross-bars, and it is provided with a suitable top or cover 28. For the purpose of raising the binder-frame a cable 29 is secured at one end to the upper cross-bar of said binder-frame and from such connection passes upwardly over a pulley 31, mounted on an arm projecting from the vertical frame, then over a pulley 32, mounted on a pintle projecting from one of the couplings 26, said cable being then extended downwardly and wound on a drum 33, mounted on a frame 34, secured to the base-frame A. The drum 33 is provided at one end with a pinion 35, adapted to receive motion from a pinion 36, secured to a shaft 37, also mounted on the frame 34. A hand-wheel 38 is secured to the shaft 37, by means of which from his position on the seat C the driver can wind the cable on the drum 33, and thus raise the binder to accommodate the corn entering it.

A bent lever 38ª is pivoted to the frame 34 and provided at the end of its upper horizontal arm with a dog 39 to engage a toothed wheel 40 on the journal of the drum, whereby to normally lock the latter. The depending arm of lever 38ª is provided with an arm 41, whereby to permit the operator to manipulate said lever by means of his foot to release the drum and permit the binder to descend.

Several pairs of feeders 42 are disposed on the forward portion of the frame A and arranged one pair above another, and the feeders of each pair are disposed side by side and spaced apart, so as to carry the cornstalks to the binder. The pairs of feeders are supported suitable distances apart by means of uprights 43, secured to the base-frame A, and are braced by means of truss-rods 43ª, also secured to said base-frame, one of said truss-rods being also secured to the guides 16 of plate or slide 15, so as to assist in supporting said guides. Each feeder 42 comprises two parallel members 44, spaced a suitable distance apart to accommodate feeder-chains 45 and sprocket-wheels 46 between them, said sprocket-wheels being secured to upright shafts 47, passing transversely through the members of the various feeders. Each feeder-chain comprises flat beveled links *a* and connecting-links *b*, the shoulders *a'* of the flat links acting as teeth to engage the stalks and force them onward. The shafts 47 at the inner or rear ends of the feeders are provided at their lower ends with bevel-pinions 48, which receive motion from bevel-pinions 49 on a shaft 50, mounted transversely on the base-frame A. The shaft 50 is provided at one end with a bevel-pinion 50ª, which meshes with and receives motion from a larger bevel-pinion 52, secured to a line-shaft 53, mounted on the base-frame A. The line-shaft 53 is also provided with a pinion 54, meshing with a pinion 54ª, secured to a shaft 55. A sprocket-wheel 56 is loosely mounted on the shaft 55 and adapted to receive motion by means of a sprocket-chain 57 from a larger sprocket-wheel 58, secured to the traction-wheel. A clutch 59 is provided whereby to lock the sprocket-wheel 56 to the shaft 55, and thus cause motion to be transmitted through the gearing above described to the feeders when the machine is in motion. For the purpose of actuating the clutch 59, which controls the operation of the line-shaft and gearing connected therewith, a bifurcated lever 60 is pivoted between its ends to a cross-bar of the base-frame and adapted to engage the sleeve of the clutch in the usual manner. A sliding bar 61 is pivotally attached to the rear end of clutch-lever 60, and with said sliding bar an operating-lever 62 is connected and adapted to be locked by means of a latch-engaging segment 63, said operating-lever being located in proximity to the driver's seat.

Flaring guard-fingers 64 are pivotally attached to the forward end of the frame A and adapted to direct cornstalks to the beveled mouths of the feeders, and the feeders of the central pair are provided at their forward ends with loops 65, whereby to movably support the upper ends of grain-boards 66. The lower ends of the grain-boards are provided with socket-pieces 67, adapted to receive balls 68 at the free ends of the guards 64, and thus said grain-boards are connected with the guard-fingers by means of ball-and-socket joints. Each guard-finger is provided at its inner or pivoted end with a crank-arm 69, to which rods or pitmen 70 are attached. The rear ends of these rods or pitmen are attached to crank-arms 71 on a transverse shaft 72, mounted in suitable bearings secured to frame A. To one end of shaft 72 an operating-lever 73 is secured, a toothed segment 74 and a latch-bar being provided for locking said lever. From this construction it will be seen that by operating the lever 73 the guard-fingers and with them the grain-boards can be readily raised and lowered and adjusted at a proper elevation.

A trough 75 is disposed under the feeders to receive the butt-ends of the stalks and support the same while they are being conveyed by the feeders (after having been cut) to the platform 22 of the binder, said trough being adapted at its rear end to project somewhat over the edge of said platform, so as to properly deposit the stalks thereonto. The forward end of the trough is preferably cut V-shaped, and below said trough parallel bars 76 are secured to the base-frame A. Between the forward ends of the bars 76 a plate 77 is secured, so as to be immediately under the V-shaped forward end of the trough, and provided at its forward edge with a flange 78, which serves to protect a pinion 79, mounted on said plate 77. A rotary cutter 80 is secured to the pinion 79 and is adapted to revolve under the V-shaped forward end of the trough. A plate 81 is disposed between the cutter and the pinion, whereby to assist in preventing the collection of dust and dirt on the pinion 79 and the gearing from which it receives motion. The plate 81 also serves to support a plate or blade 82, between which and said plate 81 the cutter is adapted to operate. The rear ends of the plate 81 and blade 82 are preferably turned down, and the forward end of the blade is preferably provided with a depending finger 83, which serves to prevent any possibility of any material being carried past the blade. The forward portion of the blade is provided with a beveled knife-edge 84, which coöperates with the teeth of the cutter to produce a shearing action when the stalks are being cut.

Motion is transmitted to the pinion 79 of the cutter 80 by means of a gear-wheel 85, secured to a short vertical shaft 86. The shaft 86 is also provided with a pinion 87, which receives motion from a pinion 88 on a horizontal shaft 89. The other end of the shaft 89 is provided with a pinion 90, which receives motion from a gear-wheel 91 on the line-shaft 53.

From the above it will be readily seen that as the machine moves forward the row of stalks will be cut near the ground and that they will then be carried rearwardly by the feeders and deposited on the platform 22. As the stalks reach the platform they will be met by two sets of packers 92 93, (one set for the butts and the other for the upper portions of the stalks,) by means of which they will be forced forwardly and accumulate on the platform to form a bundle.

Rails or bars 94 are secured to the stationary framework of the feeders and form one side of the lower portion of the bundle-holder, and a curved fender 95 forms the other side thereof, said fender being supported by means of a bent rod 96, secured to the framework of the feeders and to the platform. The binder and knotter appliances are protected from conflict with the heads of the stalks by means of fenders 97 98, supported by the vertically-movable frame of the binder, the fender 97 being secured to said movable frame by means of arms 99, secured at one end to the fender and adapted at their other ends to engage the tubular rods of the binder-frame. The fenders 97 and 98 are provided with elongated slots to accommodate the packers and needle of the binder appliances, which have their pivotal connections behind said fenders.

The lower packers 92 are connected with a crank-shaft 100, mounted on the platform 22 and in a suitable bearing in a cross-bar 101, secured to standards of the main upright frame, and the rear arms of said packers are connected, by means of pivoted rods or bars 102, with the bent rod 96 of fender 95. The crank-shaft 100 is provided with an angular tubular upward extension 103 for the reception of an angular shaft 104, adapted to telescope thereinto. The angular shaft 104 is secured to a crank-shaft 105, mounted in cross-bars 106 and 107, secured to the binder-frame, and to the cranks of said shaft the upper packers 93 (which operate on the upper portions of the stalks) are connected. To the rear arms of said upper packers rods or bars 108 are pivotally connected, the other end of said rods or bars being loosely connected to a vertical shaft 109, mounted in the binder-frame. The lower end of the lower crank-shaft 100 is provided with a pinion 110, which receives motion from a pinion secured to one end of a short diagonal shaft 111, mounted on the platform 22. The other end of the shaft 111 is provided with a pinion 112, which receives motion from a bevel gear-wheel 113, secured to the line-shaft 53, and thus motion is transmitted to the two sets of packers.

The upper end of the crank-shaft 105 is provided with a fixed cross-bar 114, having heads or shoulders 115 at its respective ends. Immediately below the cross-bar 114 a pinion 116 is loosely mounted on the shaft 105, and to this pinion a dog 117 is pivotally connected. The dog 117 is provided with a tooth or stop to engage the extended hub of the pinion, against which it is pressed by a spring 118, whereby to maintain the dog normally in the path of the heads or shoulders of the cross-bar 114, and thus cause the pinion 116 to rotate with the shaft 105. The dog 117 is also provided with a toe 119, adapted to engage a trip-lever 120 (under certain conditions hereinafter explained) and release the pinion 116 from the shaft 105. The trip-lever 120 is pivotally connected between its ends to the cross-bar 107 of the binder-frame, and its rear arm is connected with an eccentric 121 on the shaft 109. The pinion 116 meshes with and transmits motion to a pinion 122, secured to the lower end of a shaft 123, mounted in the binder-frame. The upper end of the shaft 123 projects above the top of the binder-frame, where it is provided with a small sprocket-wheel 124. At the opposite end of the binder-frame a shaft 125 is adapted to pass freely through one of the tubular members thereof. This shaft carries the knotting mechanism (hereinafter described in detail) and an ejector-arm 126. The shaft 125 is made angular in cross-section and is adapted to telescope into a tubular shaft 127, (made angular in cross-section,) mounted on the platform 22 and carrying ejector-arms 128. The upper end of the shaft 125 is provided with a comparatively large sprocket-wheel 129, over which a sprocket-chain 130 passes, whereby to transmit motion thereto from the small sprocket-wheel 124. The large sprocket-wheel is made with a cam 130ᵃ, in which a bar 131 on one arm of a Y-shaped lever 132 is adapted to operate. The lever 132 is pivotally connected to the top of the binder-frame, and to the outer arm 133 of this lever a yieldable pitman 134 is attached. The other end of the yieldable pitman is attached to a crank-arm 135 at the upper end of the shaft 109, and the latter is provided with trip-arms 136, which normally lie across the outlet of the bundle-holder and against which the corn presses to turn the shaft 109 and operate the trip-lever 120, hereinbefore referred to. Such movement of the shaft 109 independently of the Y-shaped lever and the cam of sprocket-wheel 129, with which it is connected, is permitted by the yieldable pitman 134, the purpose of the cam and its connections with the shaft 109 being to positively move said shaft and the trip-lever and trip-arms connected therewith when the bundle is ready to be discharged.

A pitman 137 is attached at one end of the large sprocket-wheel 129, and at the other end said pitman is provided with an elongated slot 138, in which a stud 139 is adjustably secured. The stud is adapted to operate freely in an elongated slot 140 in a crank-arm 141, secured to a vertical shaft 142. To the lower end of this shaft the needle 143 of the binder is secured. A cord-box 144 is attached to the binder-frame and provided in its top with a hole for the passage of the binding-cord. The cord also passes through an eye 144ᵃ on the cord-box and under a tension-spring 145, also attached to the box and pressing on the cord as it passes through said eye. The cord then passes through another eye 146, projecting from the lower portion of the box, and said cord is then threaded through the needle and properly connected to the knotter. The elongated slot in the fender 98 through which the needle and the cord pass is preferaby curved at one end, as at 98ᵃ, to permit the cord to be properly connected with the knotter and cord-holder, and in order to prevent any possibility of the cord being severed by the fender (which is preferably of sheet metal) a blunt or curved ear 98ᵇ is secured to the fender at the curved end 98ᵃ of the elongated slot therein.

In constructing the knotting and tying mechanism an L-shaped arm 147 is adjustably secured to the binder-framework, (preferably to the fender 98,) and the horizontal member of said arm is provided with a perforated boss 148, which is mounted loosely on a round portion of the shaft 125. Two rigid arms 149 150 project from the boss 148—one for the knotter *c* and the other for the cord-holder *d*. The arm 149 is provided at its free end with a perforated boss 151, in which the shank 152, depending from the bill 153 of the knotter, is mounted. A cam 154 is disposed on the boss 151 and serves to open the pivoted bill 155 of the knotter, said pivoted bill being prevented from opening too far by means of a spring-arm 156, the latter also coöperating with the cam 154 to hold said pivoted bill fixed during a portion of the revolution of the knotter. The spring-arm 156 is secured to the horizontal member of the L-shaped arm 149, and to the latter a post 157 is secured for the accommodation of a set-screw 158, by means of which to adjust the spring-arm 156 to compensate for wear of the cam and the roller on the pivoted bill. The rigid bill 153 of the knotter is provided at one side with a shoulder 159, adapted by coöperation with the cam 154 to retain the knotter devices in a proper position and at a proper elevation when and immediately after the knotter begins to turn. A pinion 160 is secured to the lower end of the shank 152 and made with a blank portion 161. The pinion 160 receives motion from a series of gear-teeth on a peripheral flange 162 on a disk 163, the latter being mounted to rotate with the telescopic shaft 125 and provided with the ejector-arm 126. In order to retain the knotter normally at its position of rest with the blank portion of the pinion coincident with the peripheral flange 162 of disk 163 and to insure the stopping of the knotter in such position, the extended hub of said pinion is made with a flat face 164, against which a flat spring 165 bears. The arm 150 is provided with a boss 166 for the accommodation of the vertical shaft 167 of the cord-holder. A disk 168 is secured to the upper end of the shaft 167 and provided with a depending flange 169, having a series of notches 170 for the reception of the cord, and with said flanged disk a spring arm or plate 171 coöperates to hold the end of the cord, the latter being disposed between said spring arm or plate and the peripheral flange of the disk. For the purpose of adjusting the spring arm or plate 171 a set-screw 172 is passed through it and adapted to engage the boss 166. A bar 173 is secured to the top of the disk 168 and provided at its ends with depending arms 174, which serve to force the corn against a knife 175, supported by the L-shaped arm, whereby to cut the cord after it shall have been tied around a bundle of stalks.

In order to properly insure the entrance of the cord into the notches of the cord-holder, a wire-guide 176 is provided. The shaft of the cord-holder is provided at its lower end with a pinion 177, adapted to receive motion at the proper time from teeth projecting inwardly from an annular shoulder or flange 178 in the disk 163, said shoulder or flange and the teeth thereon being in a lower plane than the flange 162 of said disk and the teeth thereon and at a different point in the circumference of the disk, so that during the rotation of said disk 163 the knotter and cord-holder will be operated successively, the knotter being permitted to complete its operation before the cord-holder commences to turn. The number of teeth on the annular shoulder or flange 178 is such as to turn the cord-holder a half-revolution at each revolution of the disk 163, and in order to prevent the cord-holder from making more than a half-revolution at a time and to prevent retrograde movement thereof a spring 179 is adapted to bear against flat faces 180 at diametrically opposite sides of a block 181, secured to the shaft 167.

Arms 182 project from the frame A at the rear end of the platform or binder-floor 22. Between said arms a roller 183 is mounted and adapted to receive and support in alinement with said platform or floor the platform 183[a] of a shock-carrier 184, the upright portion of which may consist of a series of parallel bent rods 185, secured together and spaced apart by standards 186 and the whole braced by truss-rods 187. The base-frame A is provided with a rearward extension 188, and partially around this extension a curved track or rail 189 is disposed, the outer portion of said track or rail alongside the extension 188 being bent downwardly to form a cam-surface 190. A base-plate 191 for a turn-table 192 is secured within the extension 188, said base-plate and turn-table being provided centrally with holes for the reception of the pintle of caster-wheel 3. Arms 194 are secured to the extension 188, and these arms serve as bearings for the shafts or pintles of guide-rollers 195. Each arm 194 is provided with two rollers, one above the other and adapted to receive the periphery of the turn-table between them, the lower rollers serving to assist in supporting the weight of the turn-table, &c., the upper rollers serving to prevent any upward displacement of the turn-table, and all of said rollers serving to insure the free movement of the turn-table. A crank-shaft 195[a] is secured to the platform of the shock-carrier at or near the outer end thereof. The crank-arm of said shaft extends over and is mounted in journal-boxes 196 on the turn-table. An arm 197 is also secured to and projects laterally beyond the platform of the shock-carrier, and on this arm a wheel 198 is mounted and adapted to travel on the track or rail 189. The turn-table 192 is provided on its under face with gear-teeth 193, with which a pinion 199, secured to a shaft 200, is adapted to mesh. The shaft 200 is provided at its forward end with a pinion 201, normally disposed between two beveled gears 202 203. These gears are secured to a sleeve 204, mounted to slide on but rotate with the shaft 55. A sliding bar 205 is mounted on the framework at the forward end of the rearward extension thereof, and with this bar one end of a lever 206 has a movable pivotal connection. The lever 206 is pivotally attached at a point between its ends to a fixed arm 207, and the forward end of said lever is bifurcated and attached to the sleeve 204. An operating-lever 208 is pivotally connected to a segment 209, secured to the framework, and the lower end of said lever is pivotally connected to the sliding bar 205, the lever being also provided with a latch to engage said segment. By means of the operating-lever 208 the sleeve 204 can be moved on its shaft, whereby to throw one or the other of the gears 202 203 into mesh with the pinion 201. The principal use, however, of this lever is to throw the gear 202 into mesh with the pinion 201 when the shock-carrier is in its normal position and filled ready to be discharged, whereby to cause the turn-table to revolve, carry the shock to one side of the machine, and so discharge the shock as to leave it standing on the ground, and also to throw the gear 203 into mesh with the pinion 201 to effect the return of the shock-carrier to its normal position to receive a new load from the binder, means (to be presently described) being provided for automatically stopping the turn-table and shock-carrier at both ends of their movements.

An arm 210 is pivotally attached to one side of the rearward extension 188 of the frame-work and projects upwardly therefrom, being provided at its upper end with a pin 211 to enter a notch 212 in a latch-lever 213. The latch-lever is pivoted at its forward end to arm 214, secured to the framework, and the rear end of said latch-lever is beveled. A rod or pitman 215 is pivoted at one end to the pivoted arm 210 and at the other end to one arm of a bell-crank lever 216, pivoted at the juncture of its two arms to the framework 195. The other arm of the bell-crank lever has a movable pivotal connection with the sliding bar 205. A guide 217 is provided for the inner end of the sliding bar, and the latter is adapted to be made to project beyond said guide, in which position it is locked under certain conditions by means of a spring-latch 218, attached to the framework and having a pin 219 to enter a hole 220 in the sliding bar 205. From the construction and arrangement of parts it will be seen that when the turn-table shall have revolved to a position to discharge the corn from the shock-carrier the crank-shaft 195 will first engage the beveled end of the latch-lever 213 and disengage it from the pivoted arm 210 and then press against said arm and move it, thereby transmitting motion to the bell-crank lever 216, the sliding bar 205, the lever 206, and finally to the sleeve 204, whereby to move the latter and throw the gear 202 out of mesh with the pinion 201 and stop any further movement of the turn-table. The shock having been discharged onto the ground, the operator will manipulate the lever 208 to throw the gear 203 into mesh with the pinion 201 and cause the shaft 200 to rotate in the reverse direction and the turn-table to be rotated to return the shock-carrier to its normal position. When the lever 208 is operated as just described, it causes the sliding bar 205 to move endwise and project beyond the guide 217, where it will be locked by the latch 219 in the path of movement of the platform of the shock-carrier. When the shock-carrier returns to its normal position, one edge of its platform will first engage the latch 219 and release the sliding bar 205 and then press against the sliding bar and move it longitudinally, resulting in throwing the gear 203 out of mesh with the pinion 201 and stopping transmission of power to the turn-table and shock-carrier connected therewith.

The tongue and whiffletrees for the draft-animals are attached to the base-frame A at 221.

The apparatus operates as follows: As the machine moves forward the stalks of corn will be met by the guard-fingers and by them be properly guided to the feeders 42 and to the cutter 80 below the mouths of said feeders. After having been cut the cornstalks will be elevated one behind another through the feeders by the feeder-chains 45, by which the stalks will be deposited on the binder table or platform 22. As the stalks enter the binder they will be moved onward therein by the upper and lower packers 92 93 and packed against the ejector-arms 126 128 and trip-arms 136. When sufficient stalks shall have been packed in the binder to form a bundle, the pressure exerted by the accumulated stalks will cause the trip-arms to yield, and thus turn the shaft 109. This will result in moving the trip-lever 120 out of the path of the toe 119 of the dog 117 and cause the cross-bar 114 to engage said dog and lock the pinion 116 to the shaft 105. Motion will now be transmitted by the pinion 116 to the pinion 122 and the shaft 123 caused to revolve, setting in motion the sprocket-wheel 129. The needle-shaft being connected with the sprocket-wheel 129, as above explained, motion will now be transmitted to the needle to manipulate the binding-cord and to cause it to be properly wound around the bundle and tied, coöperating in a manner which will be understood without a minute description at this time with the cord knotter and holder, said last-mentioned devices being also operated by the rotation of the shaft 125, to which the sprocket-wheel 129 is secured The bundle having been bound and tied, the ejector-arms during such operations will have reached a position to eject the bundle, and the shaft 109, to which the trip-arms are secured, being connected with the cam of sprocket-wheel 129 through the the medium of the yieldable pitman 134 and the Y-shaped lever 132 said trip-arms will be positively moved so as to permit the bundle to be freely ejected from the binder into the shock-carrier. When the shaft of the trip-arms is thus moved, the trip-lever will be moved in the path of the toe or dog 117 to release the pinion 116 from shaft 105, and thus stop the binding devices and at the same time move the trip-arms 136 back to their position across the outlet of the binder.

Bundles of corn will be discharged in the manner above described from the binder to the shock-carrier, and when the latter becomes sufficiently filled to form a shock the driver will operate the lever 208 to cause the turn-table to revolve and move the shock-carrier and cause the shock to be discharged in a standing position on the ground. The shock-carrier will be automatically stopped when it reaches its discharging position in the manner above described, and after the shock shall have been discharged the driver will again operate the lever 209 to cause the shock-carrier to move back to its normal position, when its engagement with the latch and sliding bar 205 will cause the operating-gearing of the turn-table to be again thrown out of gear, all as hereinbefore minutely described.

Various slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. In a corn-harvester, the combination with a rigid framework, of a vertically-movable frame, means on the rigid framework for raising and lowering said vertically-movable frame, knotter and binding devices carried by the vertically-movable frame, a telescopic shaft mounted on the rigid frame and connected with the knotter devices on the movable frame, and ejector-arms secured to the lower part of said telescopic shaft and adapted to press against the butt-ends of the cornstalks when ejecting a bundle.

2. In a harvester, the combination with a base-frame, of a shaft mounted therein at one side, a traction-wheel mounted on said shaft, pinions secured to the respective ends of said shaft, yokes secured to the frame and having rack-teeth to receive said pinions, a lever mounted loosely on said shaft, a toothed wheel secured to the shaft, a locking-bar carried by said lever and engaging the toothed wheel, a vertically-movable dog disposed in one of said yokes so as to be guided thereby, said dog adapted to engage the pinion in said yoke, a rod projecting from said dog and passing through the top of the yoke, and a grain-wheel mounted at the other side from the frame.

3. In a harvester, the combination with a base-frame and feeders supported over the base-frame, of vertically-adjustable guard-fingers attached to the base-frame, guides attached to two of the feeders, grain-boards movably supported at their upper ends by said guides, and ball-and-socket connections between the lower ends of said grain-boards and the free ends of the guard-fingers, substantially as set forth.

4. In a harvester, the combination with a frame and a series of feeders above the same, of a rotary toothed cutter below the mouth of the feeders, a blade extending over said cutter, said blade beveled at its forward end and provided with a knife-edge adapted to coöperate with said rotary cutter, the forward extremity of the blade being provided with a finger projecting downwardly below the rotary toothed cutter, substantially as set forth.

5. In a harvester, the combination with a vertically-movable binder-frame, of an upper crank-shaft mounted in the movable binder-frame, packers connected with said crank-shaft, a lower crank-shaft below the movable binder-frame, packers connected with said lower crank-shaft, telescopic connections between the upper and lower crank-shafts, gearing between the upper crank-shaft and the binder appliances, trip devices for said gearing and including trip-arms, and connections between said trip devices and binder-gearing, substantially as set forth.

6. In a harvester, the combination with a crank-shaft, packers connected thereto and a loose pinion on said crank-shaft, trip devices connected with said crank-shaft and loose pinion, a trip-lever, a shaft connected with said trip-lever and carrying trip-arms, tying mechanism, a wheel secured to the shaft of said tying mechanism, gearing between said wheel and the said loose pinion, a needle, a shaft secured thereto, a slotted arm secured to the needle-shaft and a slotted pitman connected with said slotted arm and the wheel on the shaft of the tying mechanism, substantially as set forth.

7. In a harvester, the combination with a base-frame, an upright frame and a binder-frame vertically movable on the upright frame, of a telescopic shaft mounted on the base-frame and the movable binder-frame, and ejector-arms carried by the respective sections of said telescopic shaft, substantially as set forth.

8. The combination with a binder-frame and a shaft, of an L-shaped arm secured to the binder-frame and having a boss at the free end of its horizontal arm loosely mounted on said shaft, arms diverging from said boss, a knotter mounted in one diverging arm, a cord-holder mounted in the other diverging arm, a disk mounted on the shaft to rotate therewith, two sets of gear-teeth on said disk whereby to transmit motion to the knotter and cord-holder respectively and a knife on the portion of the L-shaped arm disposed between the diverging arms, substantially as set forth.

9. The combination with a shaft and a notched disk secured thereto, of a blade and an arm disposed in proximity to the periphery of said disk and between the same and said blade, depending arms carried by said disk and adapted to travel between said arm and blade, substantially as set forth.

10. The combination in a harvester, of a needle, a cord-holder having a part adapted to rotate in a plane parallel to the plane of the needle, guides for the cord attached to a fixed part of the cord-holder, said guides consisting of a wire bent to form hooks terminating under the rotary part of the holder.

11. In a harvester, the combination with the binder-table, of a swinging shock-carrier adapted to abut against said table, and a roller adjacent to said table to receive the platform of the shock-carrier, substantially as set forth.

12. The combination with a framework, of a shock-carrier, a turn-table, a crank-shaft secured to the shock-carrier and mounted on the turn-table, and means for permitting the shaft to turn and discharge the shock from the carrier, substantially as set forth.

13. In a harvester, the combination with framework, of a trackway secured thereto and having a cam portion, a shock-carrier, a turn-table, a crank-shaft secured to the shock-carrier and mounted on the turn-table, and a wheel carried by the shock-carrier and adapted to run on said trackway, substantially as set forth.

14. The combination with a framework, of a shock-carrier, a turn-table, a shaft connecting said shock-carrier and turn-table, a series of arms secured to the framework, two rollers carried by each arm and adapted to receive the periphery of the turn-table between them and means for rotating said turn-table, substantially as set forth.

15. The combination with a framework, of a shock-carrier, a turn-table, a shaft secured to the shock-carrier and mounted on the turn-table, gearing for transmitting motion to said turn-table and means for shifting said gearing to control the direction of rotation of the turn-table, substantially as set forth.

16. The combination with framework, of a turn-table, a crank-shaft mounted on the turn-table and projecting laterally therefrom, a shock-carrier attached to the projecting end of said crank-shaft, gear-teeth on said turn-table, a shaft carrying a pinion at one end meshing with said gear-teeth, a pinion at the other end of said shaft, a driving-shaft, a sleeve mounted to slide on but rotate with said driving-shaft, gears on said sleeve at each side of said last-mentioned pinion, and means for shifting said sleeve whereby to cause motion to be transmitted in one direction or the other to the turn-table, substantially as set forth.

17. The combination with framework, of a turn-table mounted thereon, a shock-carrier disposed at one side of said turn-table and connected therewith so as to be swung thereby, gearing for driving said turn-table, and devices operating to automatically throw said gearing out of mesh when the carrier reaches the ends of its movements, substantially as set forth.

18. The combination with framework, of a turn-table mounted thereon, a shock-carrier disposed at one side of said turn-table and connected therewith so as to be swung thereby, gearing for driving the turn-table, a pivoted arm to be engaged by a part movable with the turn-table, and connections between said arm and the gearing whereby to throw the gearing out of gear when said pivoted arm is moved in one direction, substantially as set forth.

19. The combination with framework, of a turn-table mounted thereon, a shock-carrier connected with said turn-table at one side thereof, gearing for rotating the turn-table to swing the shock-carrier, means for tilting the shock-carrier to discharge the shock and a caster-wheel in the framework under the turn-table, substantially as set forth.

20. The combination with framework, of a turn-table, a shock-carrier connected with the turn-table, gearing for rotating the turn-table, a pivoted arm, a latch for said arm, a pitman connected with said pivoted arm, a bell-crank lever connected to said pitman and connections between said bell-crank lever and the gearing whereby to throw the latter out of gear when the shock-carrier engages and moves the latch and pivoted arm, substantially as set forth.

21. The combination with framework, of a turn-table, a shock-carrier connected to said turn-table, gearing for driving the turn-table, a sliding bar adapted to be struck and moved by the shock-carrier when the latter returns to its normal position, and connections between said sliding bar and the gearing whereby to throw the latter out of gear when the shock-carrier reaches its normal position, substantially as set forth.

22. The combination with framework, of a turn-table mounted thereon, a shock-carrier connected to said turn-table, gearing for driving said turn-table, a sliding bar adapted to be engaged and moved by the shock-carrier when it moves to its normal position, a latch for engaging said sliding bar and adapted to be released by the shock-carrier when it moves to its normal position, and a connection between said sliding bar and gearing whereby to throw the latter out of gear when said sliding bar is moved, substantially as set forth.

23. The combination with framework, of a turn-table, a shock-carrier connected to said turn-table, gearing for driving the turn-table, a sliding bar, a connection between said sliding bar and gearing whereby to throw the latter out of gear when the bar is moved, and means for causing the shock-carrier to move said sliding bar at the respective ends of the movements of said shock-carrier, substantially as set forth.

24. The combination with framework, of a turn-table, a shock-carrier connected thereto, gear-teeth on the turn-table, a shaft having a pinion on each end, one of said pinions meshing with the gear-teeth on the turn-table, two gears between which the other pinion is disposed, a sleeve to which said gears are secured, a driving-shaft on which said sleeve is mounted to slide and with which it rotates, a sliding bar, a pivoted lever connected with said sleeve and sliding bar, and means for sliding the bar to shift said sleeve and the gears thereon, substantially as set forth.

25. The combination with framework, of a turn-table mounted thereon, shock-carrier connected to said turn-table, gearing for driving said turn-table, a sliding bar adapted to be actuated by the shock-carrier, a connection between said sliding bar and gearing whereby the latter is thrown out of gear when the bar is slid by the shock-carrier, and an operating-lever connected to said sliding bar whereby to shift the gearing and change the rotation of the turn-table, substantially as set forth.

26. In a corn-harvesting machine, a cutting and gathering device, a binding mechanism in rear of the gathering device, which receives and binds the corn in vertical position, and a shock-table which receives the bundles on end from the binder, said table being movable laterally so as to carry the bundles bodily and deposit them to one side of the receiving position and outside the line of advance of the machine in order to give room for the passage of the machine upon a succeeding round, substantially as set forth.

In testimony whereof I have signed this specification in the presence of two subscribing witnesses.

JAMES JOSEPH KENNEDY.

Witnesses:
G. H. SMITH,
EDW. BASSETT.